(12) United States Patent
Kumar et al.

(10) Patent No.: US 10,936,614 B2
(45) Date of Patent: Mar. 2, 2021

(54) MANAGEMENT OF EXTRACT TRANSFORM LOAD (ETL) JOBS VIA A MODEL THAT IS BASED ON A BAYESIAN NETWORK

(71) Applicant: Accenture Global Solutions Limited, Dublin (IE)

(72) Inventors: Madan Kumar, Bangalore (IN); Sameer Keshkamat, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 308 days.

(21) Appl. No.: 16/024,091

(22) Filed: Jun. 29, 2018

(65) Prior Publication Data

US 2020/0004863 A1 Jan. 2, 2020

(51) Int. Cl.
*G06F 16/25* (2019.01)
*G06F 11/34* (2006.01)
*G06N 7/00* (2006.01)
*G06N 20/00* (2019.01)

(52) U.S. Cl.
CPC ........ *G06F 16/254* (2019.01); *G06F 11/3447* (2013.01); *G06N 7/005* (2013.01); *G06N 20/00* (2019.01)

(58) Field of Classification Search
CPC ....... G06F 16/254; G06F 17/30; H04L 29/08; G06Q 10/00
See application file for complete search history.

(56) References Cited

U.S. PATENT DOCUMENTS

| | | | |
|---|---|---|---|
| 8,364,519 B1* | 1/2013 | Basu | G06Q 10/0637 705/7.38 |
| 9,798,788 B1* | 10/2017 | Reiner | G06F 16/254 |
| 2011/0047525 A1 | 2/2011 | Castellanos et al. | |
| 2011/0288847 A1* | 11/2011 | Narayanan | G06F 11/3476 703/19 |
| 2017/0006135 A1* | 1/2017 | Siebel et al. | H04L 69/40 |
| 2017/0061500 A1* | 3/2017 | Borodin | G06N 20/00 |
| 2018/0060402 A1 | 3/2018 | Fabjanski et al. | |
| 2018/0183864 A1 | 6/2018 | Bender et al. | |

* cited by examiner

*Primary Examiner* — Giovanna B Colan
(74) *Attorney, Agent, or Firm* — Harrity & Harrity, LLP

(57) ABSTRACT

A device may receive, from a user device, a request for a set of forecasts of an extract transform load (ETL) completion time for a group of ETL jobs associated with an organization. The device may obtain a set of performance indicators associated with the group of ETL jobs. The device may filter the set of performance indicators using one or more filtering techniques. The device may generate the set of forecasts of the ETL completion time by using a data model to process the set of performance indicators and/or a set of assumptions associated with a set of recommendations for reducing the ETL completion time. The device may provide the set of forecasts of the ETL completion time to the user device. The device may perform one or more actions that cause the ETL system to execute the group of ETL jobs within a threshold completion time.

20 Claims, 9 Drawing Sheets

105
Extract transform load (ETL) system may carry out a three-step ETL process to execute a group of ETL jobs for an organization

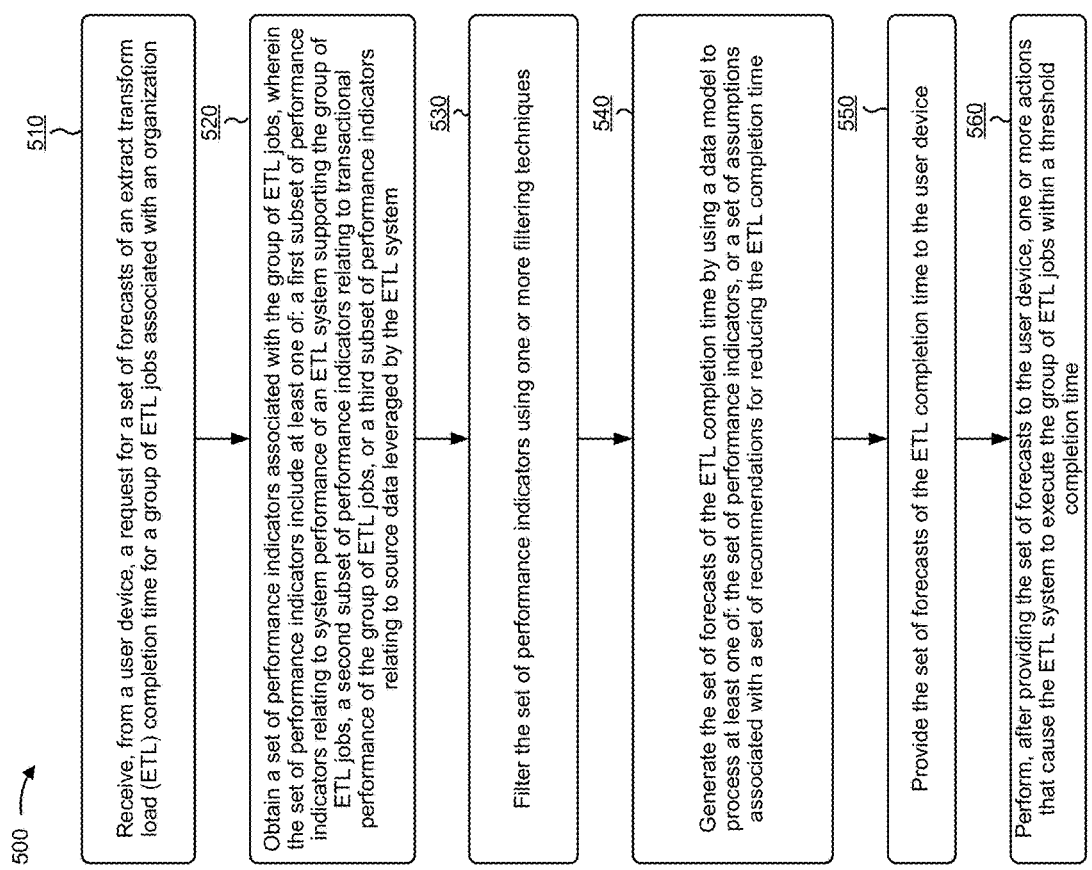

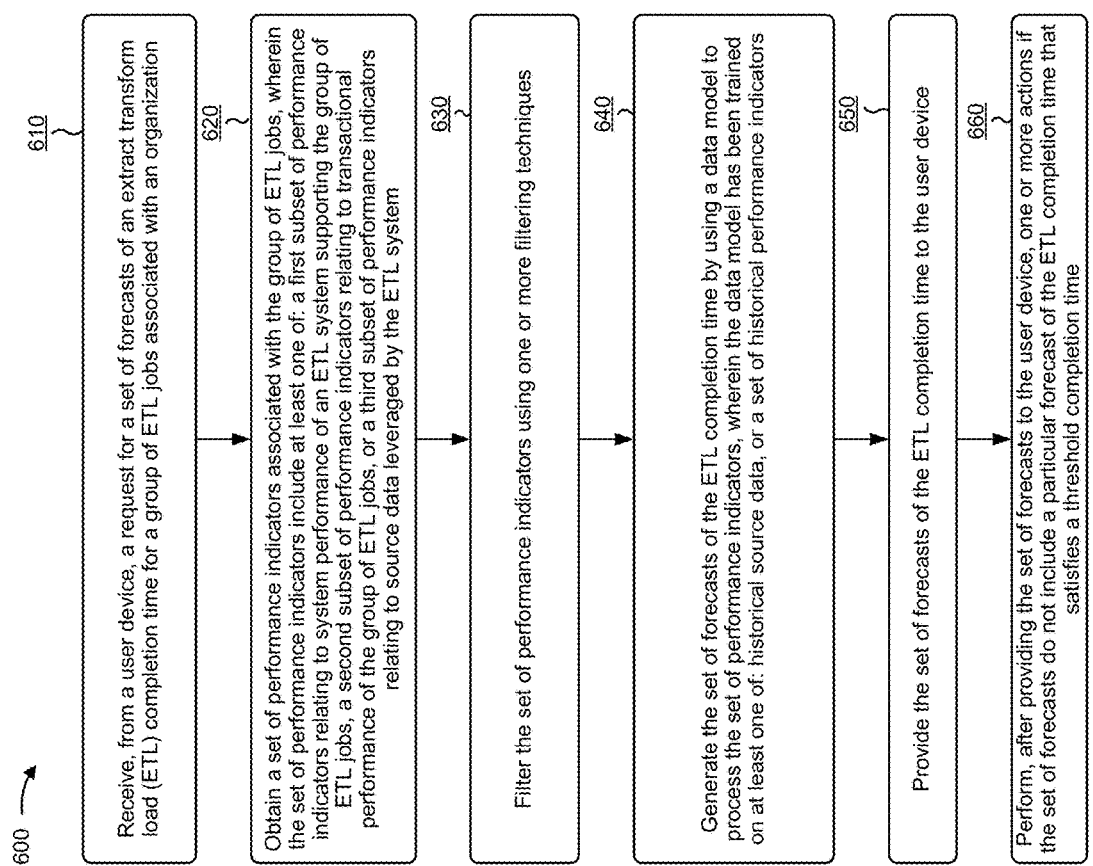

MANAGEMENT OF EXTRACT TRANSFORM LOAD (ETL) JOBS VIA A MODEL THAT IS BASED ON A BAYESIAN NETWORK

BACKGROUND

Machine learning is a field of computer science that gives computers the ability to learn without being explicitly programmed. For example, a machine learning model may be trained on a set of training data, such that the model may be used to process live data to generate useful predictions and/or classifications.

SUMMARY

According to some possible implementations, a device may include one or more memories and one or more processors that are operatively connected to the one or more memories. The one or more processors may receive, from a user device, a request for a set of forecasts of an extract transform load (ETL) completion time for a group of ETL jobs associated with an organization. An ETL system may execute the group of ETL jobs at particular time periods. The one or more processors may obtain a set of performance indicators associated with the group of ETL jobs. The set of performance indicators may include at least one of: a first subset of performance indicators relating to system performance of the ETL system supporting the group of ETL jobs, a second subset of performance indicators relating to transactional performance of the group of ETL jobs, or a third subset of performance indicators relating to source data leveraged by the ETL system. The one or more processors may generate, by processing the set of performance indicators, a set of recommendations that are capable of reducing the ETL completion time. The one or more processors may generate the set of forecasts of the ETL completion time by using a data model to process the set of performance indicators and the set of recommendations that are capable of reducing the ETL completion time. The data model may have been trained on at least one of: historical source data, a set of historical performance indicators, historical ETL completion time data, or historical network modifications data. The data model may, when generating one or more forecasts of the set of forecasts, assume that a subset of the set of recommendations have been implemented. The one or more processors may provide the set of forecasts of the ETL completion time to the user device. The one or more processors may perform, after providing the set of forecasts to the user device, one or more actions to cause the ETL system to execute the group of ETL jobs within a threshold completion time.

According to some possible implementations, a method may include receiving, by a device and from a user device, a request for a set of forecasts of an extract transform load (ETL) completion time for a group of ETL jobs associated with an organization. The method may include obtaining, by the device, a set of performance indicators associated with the group of ETL jobs. The set of performance indicators may include at least one of: a first subset of performance indicators relating to system performance of the ETL system supporting the group of ETL jobs, a second subset of performance indicators relating to transactional performance of the group of ETL jobs, or a third subset of performance indicators relating to source data leveraged by the ETL system. The method may include filtering, by the device, the set of performance indicators using one or more filtering techniques. The method may include generating, by the device, the set of forecasts of the ETL completion time by using a data model to process at least one of: the set of performance indicators, or a set of assumptions associated with a set of recommendations for reducing the ETL completion time. The method may include providing, by the device, the set of forecasts of the ETL completion time to the user device. The method may include performing, by the device and after providing the set of forecasts to the user device, one or more actions that cause the ETL system to execute the group of ETL jobs within a threshold completion time.

According to some possible implementations, a non-transitory computer-readable medium may store one or more instructions that, when executed by one or more processors, cause the one or more processors to: receive, from a user device, a request for a set of forecasts of an extract transform load (ETL) completion time for a group of ETL jobs associated with an organization. The one more instructions may cause the one or more processors to obtain a set of performance indicators associated with the group of ETL jobs. The set of performance indicators may include at least one of: a first subset of performance indicators relating to system performance of the ETL system supporting the group of ETL jobs, a second subset of performance indicators relating to transactional performance of the group of ETL jobs, or a third subset of performance indicators relating to source data leveraged by the ETL system. The one more instructions may cause the one or more processors to filter the set of performance indicators using one or more filtering technique. The one or more instructions may cause the one or more processors to generate the set of forecasts of the ETL completion time by using a data model to process the set of performance indicators. The data model may have been trained on at least one of: historical source data or a set of historical performance indicators. The one or more instructions may cause the one or more processors to provide the set of forecasts of the ETL completion time to the user device. The one or more instructions may cause the one or more processors to perform, after providing the set of forecasts to the user device, one or more actions if the set of forecasts do not include a particular forecast of the ETL completion time that satisfies a threshold completion time.

BRIEF DESCRIPTION OF THE DRAWINGS

FIGS. 4-6 are flow charts of an example process for using machine learning to generate a set of forecasts of an extract transform load (ETL) completion time for a group of ETL jobs, and for performing one or more actions to ensure that the ETL completion time satisfies a requested ETL completion time.

DETAILED DESCRIPTION

Figure 1A:
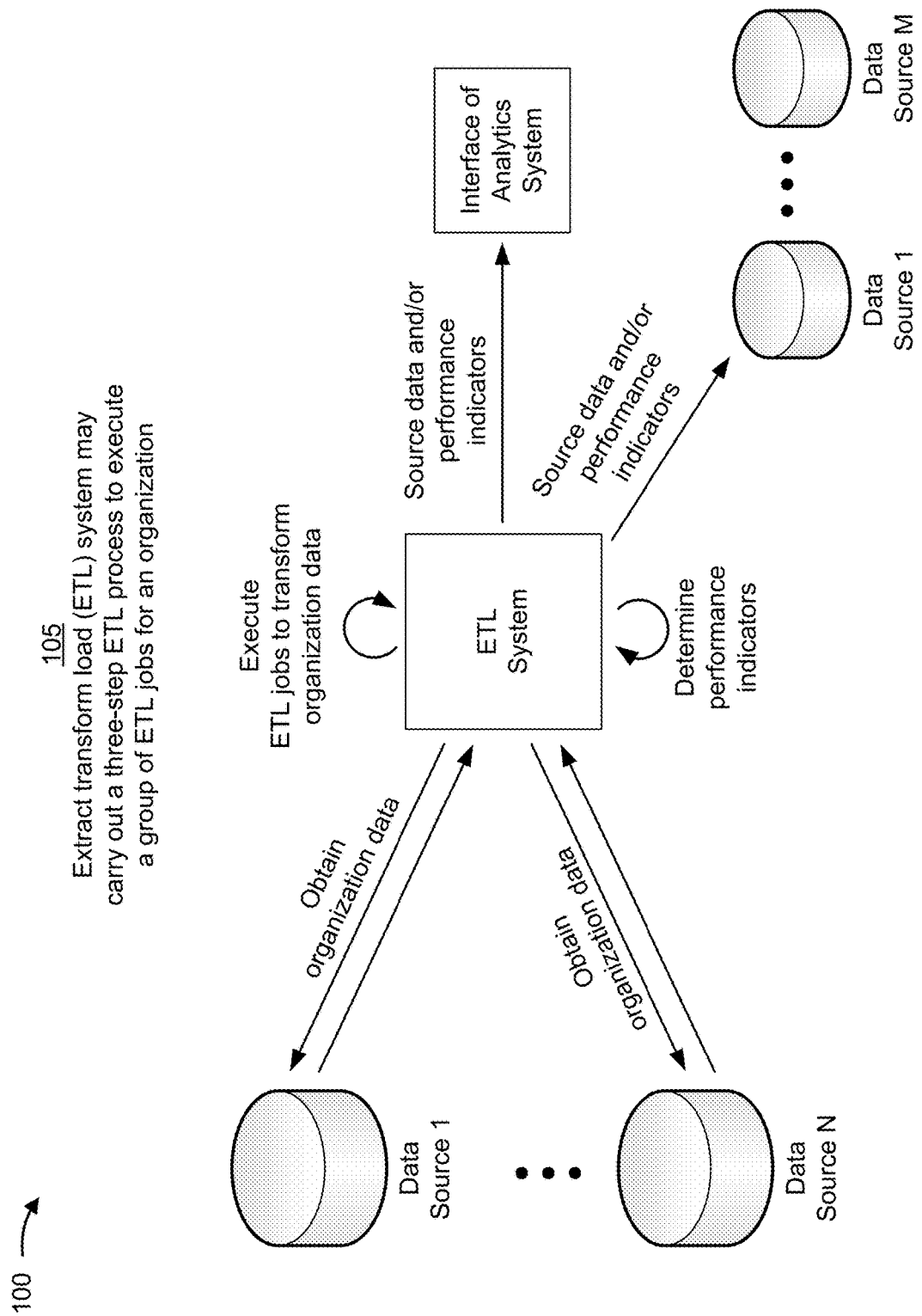
FIGS. 1A-1D are diagrams of an example implementation described herein.

The following detailed description of example implementations refers to the accompanying drawings. The same reference numbers in different drawings may identify the same or similar elements.

An organization may utilize a data management system to manage various types of organization data. For example, the organization may use an extract transform load (ETL) system to execute a group of ETL jobs that are tasked with obtaining (i.e., extracting) the organization data, transforming (e.g., filtering, sorting, modifying, etc.) the organization data, and providing (i.e., loading) the transformed organization data to an analytics system where an analyst may use the transformed organization data to make decisions associated with managing one or more processes of the organization.

Performance of the ETL system may be measured by an ETL completion time. For example, if the ETL system is to execute 4,000 ETL jobs daily, the ETL completion time may indicate a time at which the ETL system is to complete execution of all 4,000 ETL jobs. In many cases, the ETL system may execute the ETL jobs in the evening, such that analysts of the organization may view and analyze the transformed organization data the following business day.

However, the ETL system used by the organization may struggle to consistently deliver an ETL completion time that allows the organization to take advantage of the transformed organization data generated by the ETL jobs. For example, if the organization requests that the ETL system execute the 4,000 ETL jobs by 9:00 AM, but the ETL system only executes 3,500 ETL jobs by 9:00 AM, analysts of the organization may not be able to use some of the output from the ETL system. Furthermore, dependencies between the completed ETL jobs and pending ETL jobs may further inhibit the analysts from using the outputs of the ETL system.

This wastes processing resources and/or network resources of devices associated with the organization as the analysts may need to manually interact with devices to generate the transformed organization data, may need to perform independent research to obtain or generate the transformed organization data, and/or the like. Furthermore, the ETL system wastes processing resources and/or network resources by continuing to execute the ETL jobs after the requested ETL completion time, despite that the analysts of the organization may be unable to use the transformed organization data that will be generated by the 500 ETL jobs that are completed after the requested ETL completion time.

Furthermore, if the ETL system is unable to execute the group of ETL jobs within the requested ETL completion time, a vendor organization that provides technology support to the ETL system may have to pay penalties that are dictated by a service level agreement (SLA). Additionally, creation of a one-size-fits-all ETL system may be difficult given that many ETL jobs are customized to the needs of the organization that is using the ETL system.

Some implementations described herein provide an ETL management platform to generate a set of forecasts of an ETL completion time for a group of ETL jobs associated with an organization, and to perform one or more actions to ensure that the ETL completion time satisfies an ETL completion time that is requested by the organization. For example, an ETL system may periodically execute a group of ETL jobs for the organization, such that each of the group of ETL jobs obtains organization data, transforms the organization data, and provides the transformed organization data to a collection of data sources. In this case, while the ETL system is executing the group of ETL jobs, the ETL system may generate a set of performance indicators that are relating to recent performance of the ETL system and/or the group of ETL jobs, and may provide the set of performance indicators to the collection of data sources.

In some implementations, the ETL management platform may receive, from a user device, a request for the set of forecasts of the ETL completion time for the group of ETL jobs. In this case, the ETL management platform may obtain the set of performance indicators from the collection of data sources, may filter the set of performance indicators (e.g., based on a set of exceptions, as defined elsewhere herein), and may use a data model (e.g., a Bayesian Network) to generate the set of forecasts of the ETL completion time.

In some implementations, the ETL management platform may also generate a set of recommendations that are capable of improving the ETL completion time, and may provide the set of recommendations and the set of performance indicators as input to the data model. In this case, the data model may be able to generate forecasts that assume that particular recommendations have been implemented, such that the forecasts are a prediction of the ETL completion should the particular recommendations be implemented prior to the ETL system executing the group of ETL jobs.

In some implementations, the ETL management platform may provide the set of forecasts of the ETL completion time for display on the user interface of the user device. Additionally, or alternatively, the ETL management platform may perform one or more actions that cause the ETL system to execute the group of ETL jobs within the ETL completion time that is requested by the organization.

By forecasting the ETL completion time, the ETL management platform is able to identify when preventative actions need to be taken to ensure that the group of ETL jobs execute within a requested ETL completion time. In this way, the ETL management platform conserves processing resources and/or network resources that might otherwise be used to obtain and transform the organization data after the requested ETL completion time (e.g., which may be too late for analysts of the organization to use the transformed organization data to derive valuable insights). Furthermore, by identifying issues that may prevent the group of ETL jobs from executing within the requested ETL completion time, the ETL management platform is able to perform preventative actions that improve the ETL completion time and conserve processing resources and/or network resources that might otherwise be used to perform error correction procedures on particular ETL jobs, re-execute ETL jobs that failed an initial execution, and/or the like.

FIGS. 1A-1D are diagrams of an example implementation 100 described herein. For example, example implementation 100 may include a first collection of data sources (shown as Data Source 1 through Data Source N), an extract transform load (ETL) system, a second collection of data sources (shown as Data Source 1 through Data Source M), an analytics system (e.g., which may include a group of user devices), and an ETL management platform. While some implementations described herein refer to the ETL management platform as being separate from the ETL system, it is to be understood that in some implementations, the ETL management platform may be implemented as part of the ETL system and may perform one or more actions described herein as being performed by the ETL system.

As shown in FIG. 1A, and by reference number 105, the ETL system may carry out a three-step ETL process to execute a group of ETL jobs for an organization. In some implementations, the ETL system may obtain (i.e., extract) organization data from the first collection of data sources.

The organization may include various types of data, depending on the context in which the ETL system is used. In one example context, the organization data may include order management and inventory data, transportation management data, procurement data, asset lifecycle management data, supply chain management data, supplier management data, project and portfolio management data, customer relationship management data, and/or the like. To provide a particular example, the order management and inventory data may include data identifying particular customer orders, inventory data identifying current inventory for a particular store or warehouse, tracking data identifying a current geographic location of a product, and/or the like.

As another example, the transportation management data may include the tracking data that identifies the current geographic location of the product, vehicle data identifying delivery schedules and/or delivery routes, packaging data (e.g., identifying how products are packaged, how much time is spent packaging the products, packaging analytics data, etc.), and/or the like. As another example, the procurement data may include contractual data relating to agreements between the organization and client organizations for particular goods and/or services, such as a final contract between the organization and a client organization, records of negotiations between the organization and the client organization, non-disclosure agreements, and/or the like.

As another example, the asset lifecycle management data may include data identifying a tangible asset (e.g., a property, a product, a vehicle, etc.), data identifying an intangible asset (e.g., intellectual property, human capital, a financial asset, etc.), and/or the like. As another example, the supply chain management data may include data identifying raw materials used to create a product, data identifying work-in-process inventory, data identifying finished products, data tracking the raw materials, the work-in-process inventory, and/or the finished products, and/or the like.

In some implementations, the ETL system may execute the group of ETL jobs to transform the organization data. The group of ETL jobs may transform the organization data by using one or more rules that may filter the organization data, aggregate the organization data, sort the organization data, modify the organization data, validate the organization data, and/or the like. In some implementations, the group of ETL jobs may include thousands of ETL jobs, tens of thousands of ETL jobs, or more, and may include ETL jobs for each of the different types of organization data, such as ETL jobs for transforming the order management and inventory data, ETL jobs for transforming the transportation data, ETL jobs for transforming the procurement data, and/or the like.

As an example, a first group of ETL jobs may filter, aggregate, sort, modify, and/or validate the order management and inventory data. In this example, the first group of ETL jobs may include a first ETL job for aggregating the data identifying the particular customer orders (e.g., to create a total number of orders for a particular store, a particular region, for the entire organization, etc.), a second ETL job for aggregating the data identifying the current inventory (e.g., for a particular store or warehouse, for a particular region, for the entire organization, etc.), a third ETL job for validating the data identifying the particular customer orders, a fourth ETL job for validating the data identifying the current inventory, and/or the like.

As another example, a second group of ETL jobs may filter, aggregate, sort, modify, and/or validate the transportation management data. In this example, the second group of ETL jobs may include a first ETL job for aggregating the tracking data (e.g., to create aggregate totals for the tracking data for a particular store or warehouse, for a particular region, for the entire organization, etc.), a second ETL job for aggregating the vehicle data (e.g., to create aggregate totals for the vehicle data for a particular fleet of vehicles, for all vehicles used by the organization, etc.), a third ETL job for validating the tracking data, a fourth ETL job for validating the vehicle data, and/or the like.

In some implementations, the ETL system may execute the group of ETL jobs at particular time periods. For example, the ETL system may be configured to execute a first subgroup of ETL jobs at a first time period, a second subgroup of ETL jobs at a second time period, a third subgroup of ETL jobs at a third time period, and/or the like.

In some implementations, the ETL system (or the ETL management platform) may determine a set of performance indicators. For example, the ETL system may determine a set of performance indicators, which may be subsequently used to forecast the ETL completion time, as described further herein. In this case, the ETL system may determine a first subset of performance indicators relating to system performance of one or more parts of the ETL system (e.g., a device within the ETL system, a hardware component of the device, a software element of the device, etc.), may determine a second subset of performance indicators relating to transactional performance of the group of ETL jobs, may determine a third subset of performance indicators relating to source data obtained and/or generated from the group of ETL jobs, and/or the like. The source data may include the organization data, the transformed organization data, metrics relating to the organization data and/or the transformed organization data, parameters relating to organization data and/or the transformed organization data, and/or the like.

The first subset of performance indicators may include a first performance indicator identifying a central processing unit (CPU) performance utilization rate, a second performance indicator identifying a memory utilization rate, a third performance indicator identifying a storage utilization rate, a fourth performance indicator identifying a metric that measures database performance, and/or the like.

To provide an example, while a first device of the ETL system is executing particular ETL jobs, the ETL system may monitor CPU performance of the first device and may determine a CPU utilization rate. The CPU utilization rate may identify, for a particular time period, an amount of resources being utilized in relation to a total amount of available resources. For example, the CPU utilization rate may indicate an amount of time that the CPU spends processing source data in relation to an amount of idle time where the CPU is waiting for input and/or output to trigger a processing action. Additionally, or alternatively, while the first device of the ETL system is executing the particular ETL jobs, the ETL system may monitor available memory (e.g., random access memory (RAM)) within the first device and may determine a memory utilization rate. The memory utilization rate may identify an amount of memory being utilized in relation to a total amount of available memory.

Additionally, or alternatively, assume the first device provides source data to a first data source. In this case, the ETL system may monitor the first data source and may determine the storage utilization rate. The storage utilization rate may identify an amount of storage space (e.g., hard drive space) being utilized in relation to a total amount of storage space available. Additionally, or alternatively, the ETL system may determine a metric to measure database performance. For example, the ETL system may determine a metric that identifies an amount of time needed for the data source to store the source data after the source data is received, a rate at which rows or columns of a data structure associated with the data source are populated, a time associated with delays that may have occurred due to load balancing between the data source and other data sources, and/or the like.

The second subset of performance indicators may include a first performance indicator identifying an amount of latency, a second performance indicator identifying a recovery time (e.g., a time needed to recover from a failure that occurred during execution of an ETL job), a third performance indicator identifying ETL job availability time (e.g., a total amount of time that an ETL could be available to execute versus an actual amount of time that the ETL job was available to execute), a fourth performance indicator identifying a recovery time for blocking transactions (e.g., a time that a first ETL job is delayed as a result of an issue relating to a second ETL job), and/or the like.

To provide an example, while a first device of the ETL system is executing ETL jobs, the ETL system may monitor the first device and may determine a latency value associated with organization data obtained for the ETL jobs and/or organization data that is transformed by the ETL jobs. The latency value may identify a time between requesting the organization data and receiving the organization data, a time between transforming the organization data and a time when a data source receives the transformed organization data, and/or the like.

Additionally, or alternatively, while the first device is executing the ETL jobs, the ETL system may monitor the first device and may determine a recovery time value associated with the ETL jobs. The recovery time value may indicate a time spent repairing or fixing errors that occurred during execution of the ETL jobs.

Additionally, or alternatively, while the first device is executing the ETL jobs, the ETL system may monitor the first device and may determine an ETL job availability time for the ETL jobs. Additionally, or alternatively, while the first device is executing the ETL jobs, the ETL system may monitor the first device and may determine a recovery time for one or more blocking transaction that may have occurred during execution of the ETL jobs.

The third subset of performance indicators relating to the source data generated from the data sources or the group of ETL jobs may include one or more performance indicators relating to an amount of data processed and/or one or more performance indicators relating to data quality. The one or more performance indicators relating to an amount of data processed may include a first performance indicator identifying an amount of source data processed, a second performance indicator identifying a number of ETL jobs executed, a third performance indicator identifying a variance in the amount of source data processed, a fourth performance indicator identifying a variance in the number of ETL jobs executed, and/or the like.

To provide an example, while a first device of the ETL system is executing ETL jobs, the ETL system may monitor the first device and may determine an amount of source data that has been processed by the first device during execution of the ETL jobs. Additionally, or alternatively, the ETL system may monitor the first device and may determine the number of ETL jobs that the first device performed. Additionally, or alternatively, the ETL system may determine variances in the amount of source data processed and/or in the number of ETL jobs executed, as described further herein.

The one or more performance indicators relating to data quality may include a first performance indicator identifying a degree of consistency of the source data (e.g., by identifying that organization data that is received is of particular data types), a second performance indicator identifying degree of accuracy of the source data (e.g., by identifying a frequency at which particular errors occur, etc.), a third performance indicator identifying a degree of completeness of the source data (e.g., by identifying whether the organization data received is complete or has a threshold number of null fields), a fourth performance indicator identifying adjustment factor which may be provided by a human expert (e.g., to account for unforeseeable events that a machine may be unable to detect), and/or the like.

To provide an example, while a first device of the ETL system is executing ETL jobs, the ETL system may monitor the source data and may determine a value associated with a degree of consistency of the source data by determining whether the source data is of a data type that is commonly used for the ETL jobs. Additionally, or alternatively, the ETL system may monitor the source data to determine a value identifying a degree of accuracy of the organization data by identifying a frequency at which particular types of source data were obtained and/or transformed during execution of the ETL jobs.

Additionally, or alternatively, the ETL system may monitor the source data and may determine a value identifying a degree of completeness of the source data by identifying whether the source data has a threshold number of null fields, by comparing the number of null fields to fields populated with non-null values, and/or the like. Additionally, or alternatively, the ETL system may receive an adjustment factor value from a human expert that may be used to account for changes that a machine may be unable to detect. For example, if a particular ETL job is completely reworked and provides different values, different data types, different amounts of data, and/or the like, a human expert may provide information relating to the reworked ETL jobs, which may be considered by the ETL system.

In some implementations, the ETL system may process one or more of the above-mentioned performance indicators to determine totals and/or averages for particular performance indicators. For example, the ETL system may determine performance indicators for particular devices, particular hardware components of the devices, particular software elements of the devices, particular ETL jobs, particular source data, and/or the like, As an example, the ETL system may determine an amount of source data processed by each device of the ETL system, and may use the amount of source data processed by each device to determine a total amount of data processed by all (or some) of the devices of the ETL system, to determine an average amount of data processed by all (or some) of the devices of the ETL system, and/or the like.

In some implementations, the ETL system may provide the source data and/or the set of performance indicators for display on an interface of the analytics system. For example, the ETL system may provide the source data and/or the set of performance indicators for display on an interface of the analytics system to allow an analyst to use the source data and/or the set of performance indicators to make decisions relating to one or more processes of the organization.

In some implementations, the ETL system may provide the source data and/or the set of performance indicators to the second collection of data sources. For example, the source data and/or the set of performance indicators may be stored by the second collection of data sources, such that the source data and/or the set of performance indicators may be queried and used by the ETL management platform for training data models, as described further herein. In some implementations, large quantities of source data may be processed by the ETL system (e.g., gigabytes of data, terabytes of data, petabytes of data, etc.), such that a human operator may be objectively unable to process and/or create records of the source data.

In this way, the ETL system is able to provide the source data and/or the set of performance indicators for display on the interface of the analytics system. Furthermore, the ETL system is able to provide the source data and/or the set of performance indicators to the second collection of data sources to allow the ETL management platform to use the source data and/or the set of performance indicators to train a data model, as described further herein.

Figure 1B:
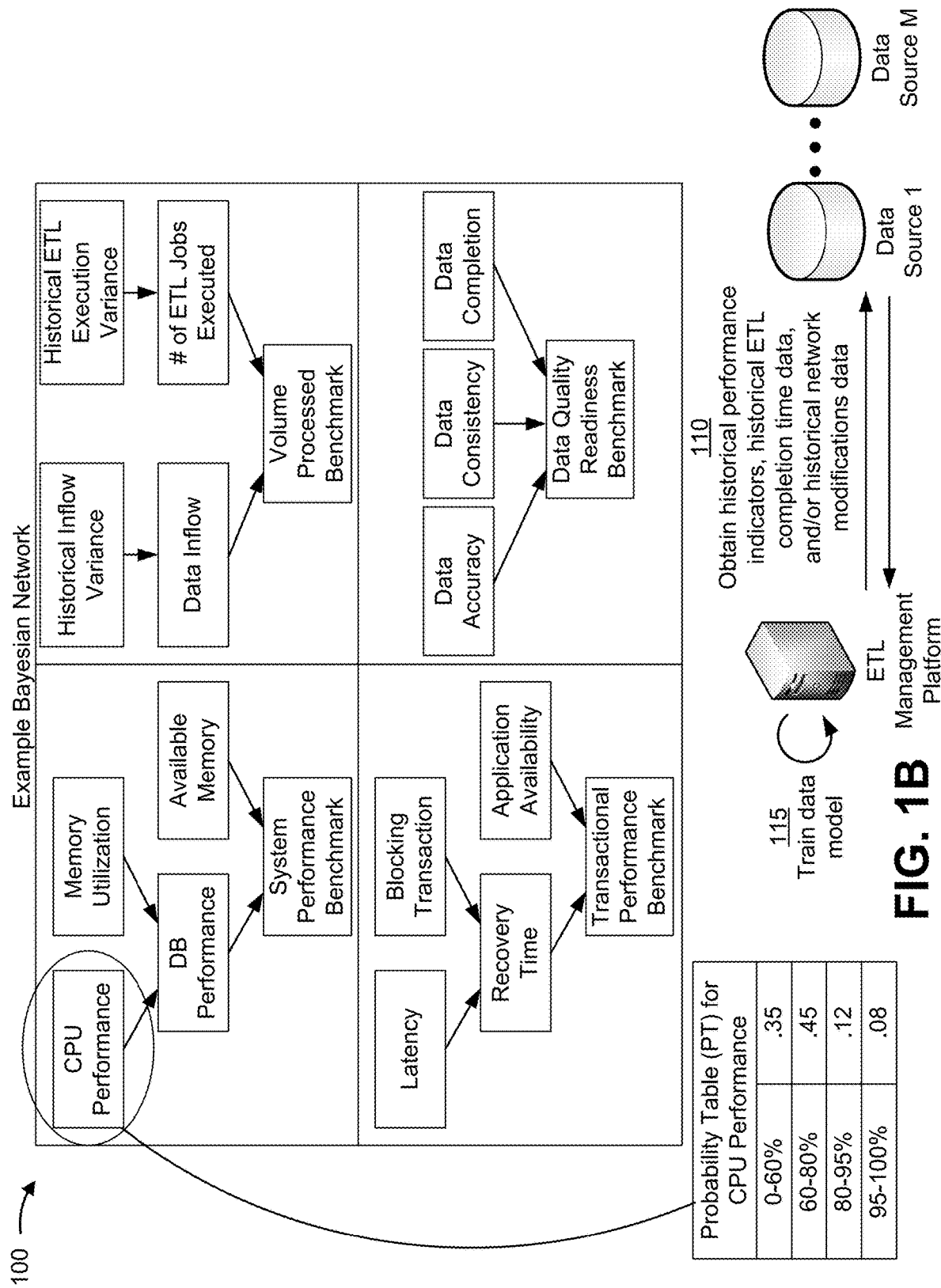

As shown in FIG. 1B, the ETL management platform may train a data model using historical data, which may include a set of historical performance indicators, historical ETL completion time data, historical network modifications data, and/or the like. The set of historical performance indicators may be the performance indicators described with respect to FIG. 1A, which may have been collected over a particular time period (e.g., six months, a year, five years, etc.). The historical ETL completion time data may identify a set of historical ETL completion times of past forecasts that have been made by the ETL management platform. The historical network modifications data may identify historical changes that have been made to the ETL system and/or to the group of ETL jobs to improve ETL completion time.

As shown by reference number 110, the ETL management platform may obtain the historical data from the second collection of data sources. For example, the ETL management platform may request (e.g., query) the second collection of data sources to obtain the historical data. Additionally, or alternatively, the second collection of data sources may be configured to automatically provide the historical data to the ETL management platform (e.g., periodically over an interval, etc.).

As shown by reference number 115, the ETL management platform may use the historical data to train a data model. The data model may be a Bayesian Network, a neural network, a Gaussian Mixture Model (GMM), and/or another type of predictive machine learning model.

In some implementations, a Bayesian Network based prediction model may be used by the ETL management platform to forecast an ETL completion time for the group of ETL jobs. For example, the ETL management platform may train a Bayesian Network based prediction model on the historical data, such that the Bayesian Network is able to predict the historical ETL completion times. In this way, the Bayesian Network may be used to process real-time requests for forecasts of the ETL completion time, as described further herein.

In some implementations, the Bayesian Network may include a directed acyclic graph (DAG) that includes a set of nodes and a set of edges. For example, the ETL management platform may execute a Bayesian Network technique (or a similar technique) to generate a directed acyclic graph (DAG) that includes a set of nodes and a set of edges. The set of nodes may represent particular historical performance indicators and the set of edges may represent relationships between the particular historical performance indicators. The set of nodes may include node metadata that is used to store a set of probability tables. A probability table may identify a probability of a node being in a particular state. The particular state may identify a predicted value of a performance indicator or a range of predicted values associated with the performance indicator.

As shown as an example, a probability table for CPU performance may identify the probability of the CPU utilization rate being within particular ranges of values. For example, the probability table may indicate that there is a 35% chance that the CPU utilization rate will be between 0% and 60%, a 45% chance that the CPU utilization rate will be between 60% and 80%, a 12% chance that the CPU utilization rate will be between 80% and 95%, and an 8% chance that the CPU utilization rate will be between 95% and 100%.

In some implementations, the ETL management platform may determine predicted values for the set of node probably tables. For example, the ETL management platform may determine the predicted values for the CPU performance node (as described above) and any other nodes that are part of the Bayesian Network. In this case, the ETL management platform may determine the predicted values by processing the historical data to determine a likelihood of each predicted value occurring.

In some implementations, the ETL management platform may determine a predicted value for a probability table that is conditioned on values found in one or more other probability tables. For example, because CPU performance and memory utilization influence database performance, the ETL management platform may determine one or more predicted values for the database performance probability table by considering values included in the probability tables for CPU performance and memory utilization.

In some implementations, the ETL management platform may determine one or more predicted values for a set of benchmark performance indicators. As shown as an example, the Bayesian Network may include a first benchmark performance indicator for system performance, a second benchmark performance indicator for transactional performance, a third benchmark performance indicator for volume processed, and a fourth benchmark performance indicator for data quality readiness. In this case, the ETL management platform may determine one or more predicted values for each benchmark performance indicator by considering predicted values for probability tables of performance indicators that influence the benchmark performance indicators. As an example, the ETL management platform may determine the system performance probability table by considering predicted values included in the database performance probability table and predicted values included in a probability table for an available memory performance indicator.

In some implementations, the ETL management platform may use the set of probability tables to generate a forecast of an ETL completion time. For example, the ETL management platform may execute a scoring technique to process the set of probability tables for the benchmark performance indicators to determine a value that may be used to forecast the ETL completion time.

In some implementations, the ETL management platform may continuously train the Bayesian Network based prediction model until a threshold level of accuracy is satisfied. For example, the ETL management platform may continue to execute the Bayesian Network and continue to modify probability table values within nodes of the Bayesian Network until the forecasts of the ETL completion times satisfy a threshold level of accuracy (e.g., a forecast may be accurate if the forecast matches a historical ETL completion time value).

In some implementations, the ETL management platform may utilize knowledge from a domain expert to increase efficiency and accuracy of the machine learning performed by the Bayesian Network based prediction model. For example, the ETL management platform may train the Bayesian Network based prediction network using information provided by a domain expert. In this case, the information provided by the domain expert may be encoded in the DAG, such that the information is stored using edges that connect the nodes. The information provided by the domain expert may help account for factors that a machine may be unable to predict or identify.

In some implementations, the ETL management platform may use the Bayesian Network based prediction model to make accurate predictions even if the model is not trained on complete datasets. For example, the ETL management platform may filter the information being provided as input to the model, such that the data is cleaned and outlier data points that may reduce accuracy of the predictions are removed. This prevents the outlier data points from skewing a prediction made by the model. By utilizing machine learning techniques that account for a joint probability distribution of data points that exclude outliers, the ETL management platform is able to use the Bayesian Network based prediction model to make predictions without being dependent upon having access to a fully observed dataset.

In some implementations, the ETL management platform may use the Bayesian Network based prediction model to make accurate predictions even if unforeseeable events occur. For example, unforeseen human activities which cannot be predicted by the model may reduce accuracy of the model's predictions. To provide a few examples, a first ETL job running in parallel with a second ETL job may cause unforeseen consequences on the second ETL job. As another example, an issue may cause a technology expert to immediately remedy an error, but the model may have no way to account for the real-time decision by the organization to allow the technology expert to remedy the error. As another example, a vendor may upgrade a product, application, or interface, which may impact the ETL process.

To address these types of cases, the ETL management platform may train the Bayesian Network based prediction model using human experts, as described above. For example, a human expert may be able to provide, as input to the model, a real-time event or consequence. In this case, the model may have an adjustment factor when making a prediction, which may account for the real-time event or consequence. Additionally, or alternatively, the ETL management platform may be able to identify the real-time event or consequence as an outlier data point, in which case the ETL management platform may filter the data identifying the real-time event or consequence before the model is used to make a prediction.

In some implementations, the ETL management platform may train the Bayesian Network based prediction model using the historical network modifications data. For example, over time, a group of network modifications may be made to the ETL system and/or to the group of ETL jobs to improve overall performance of the ETL system. The group of network modifications may include a first network modification indicating to forego execution of one or more ETL jobs of the group of ETL jobs, a second network modification to repair or update the one or more ETL jobs, a third network modification to modify a distribution of resources that are to be used by the ETL system when executing the one or more ETL jobs, a fourth network modification to add an additional device, an additional hardware component, or an additional software element to the ETL system, and/or the like.

In this case, the ETL management platform may use the Bayesian Network to generate a forecast of an ETL completion time that assumes that a particular network modification has been made. For example, the ETL management platform may train the Bayesian Network to take, as input values, assumptions that particular network modifications have been implemented. This may allow the Bayesian Network to predict an ETL completion time given that one or more network modifications have been made, which may allow a user to see a forecast of what an ETL completion time might be if one or more network modifications are made.

In this way, the ETL management platform is able to train a data model which may be used to predict the ETL completion time for the group of ETL jobs.

Figure 1C:
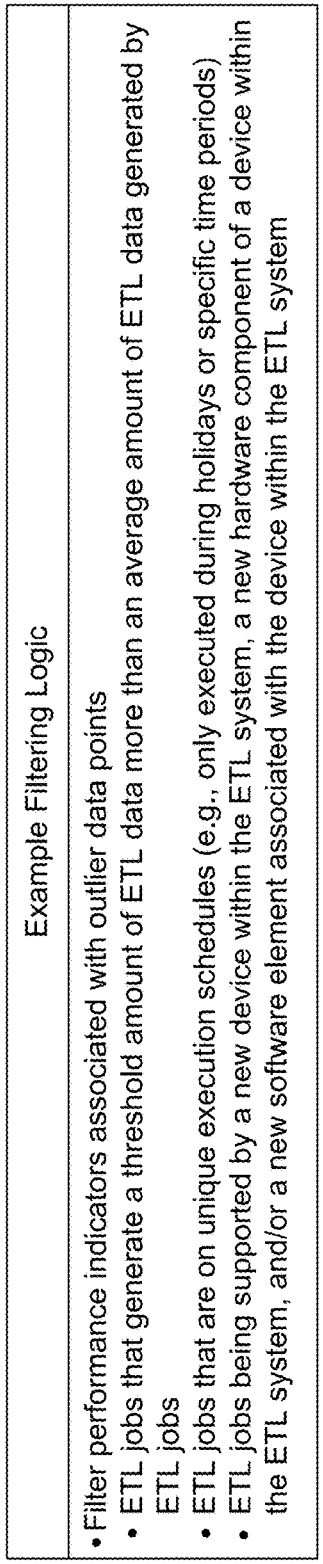
Figure 1C:
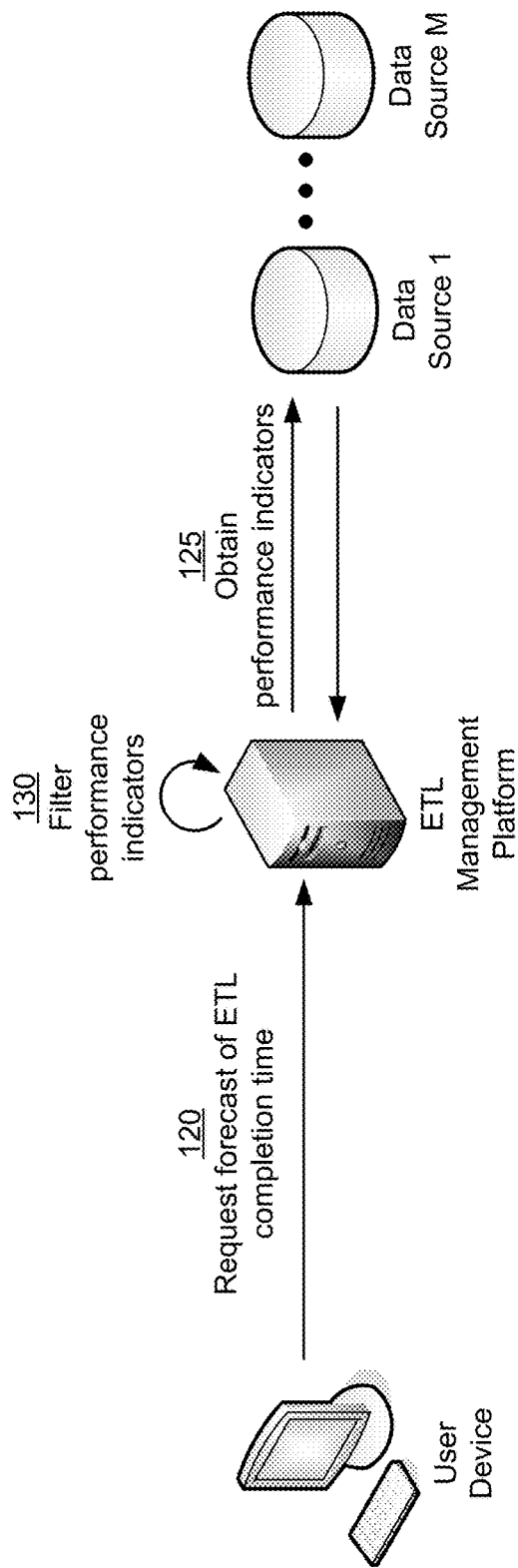

As shown in FIG. 1C, and by reference number 120, the ETL management platform may receive, from the user device (e.g., a device operated by an employee of the organization), a request for a set of forecasts of an ETL completion time. For example, an employee of the organization may interact with an interface of an ETL management program to input a request for a set of forecasts of the ETL completion time. The request may be a request for a forecast of an ETL completion time for one or more time periods, a request for a forecast of a percentage chance that the ETL completion satisfies a requested ETL completion (e.g., a threshold completion time, a confidence level of the ETL completing within a time input by a user, etc.), and/or the like.

As shown by reference number 125, the ETL management platform may obtain a set of performance indicators that may be used to generate the set of forecasts of the ETL completion time. For example, the ETL management platform may send a request (e.g., query) to the second set of data sources to obtain a set of performance indicators associated with recent performance of the ETL system (e.g., within the past hour, past day, past week, etc.).

As shown by reference number 130, the ETL management platform may filter the set of performance indicators. For example, the ETL management platform may execute one or more filtering techniques to filter the set of performance indicators based on a set of exceptions.

The set of exceptions may be used to identify outlier data points within the set of performance indicators, which may prevent the outlier data points from reducing accuracy of the data model, as described further herein. The set of exceptions may include a first exception to remove a particular performance indicator if the particular performance indicator is associated with an ETL job that generates a threshold amount of the source data, a second exception to remove the particular performance indicator if the particular performance indicator is associated with an ETL job that is being supported by a new device, a new hardware component, or a new software element within the ETL system (e.g., because source data processed by the new device, the new hardware component, or the new software element may skew results of the data model), a third exception to maintain, remove, or modify (e.g., increase, decrease, etc.) a performance indicator to account for one or more trends, and/or the like.

As an example, the first exception may cause the ETL management platform to remove a performance indicator value for an ETL job that generates 75% more or 75% less than a median amount of source data. As another example, the second exception may cause the ETL management platform to remove a performance indicator value that is associated with a new type of server device that has been deployed as part of the ETL system. As another example, the third exception may cause the ETL management platform to remove a first performance indicator value that identifies an amount of source data generated for an ETL job that executes once annually so that the data model may consider performance indicator values for ETL jobs that execute more frequently (e.g., daily, weekly, etc.), without the first performance indicator value skewing the results of the data model.

By filtering the set of performance indicators to remove outlier data points, the ETL management platform improves the overall accuracy of the forecasts generated by the data model. This allows the ETL management platform to conserve processing resources and/or network resources that might otherwise be used to process source data after a requested ETL completion time (e.g., which may be generated too late for an analyst of the organization to use to derive valuable insights). Furthermore, the ETL management platform conserves processing resources and/or network resources that would be used by the data model to process unhelpful data (i.e., the outlier data points).

Figure 1D:
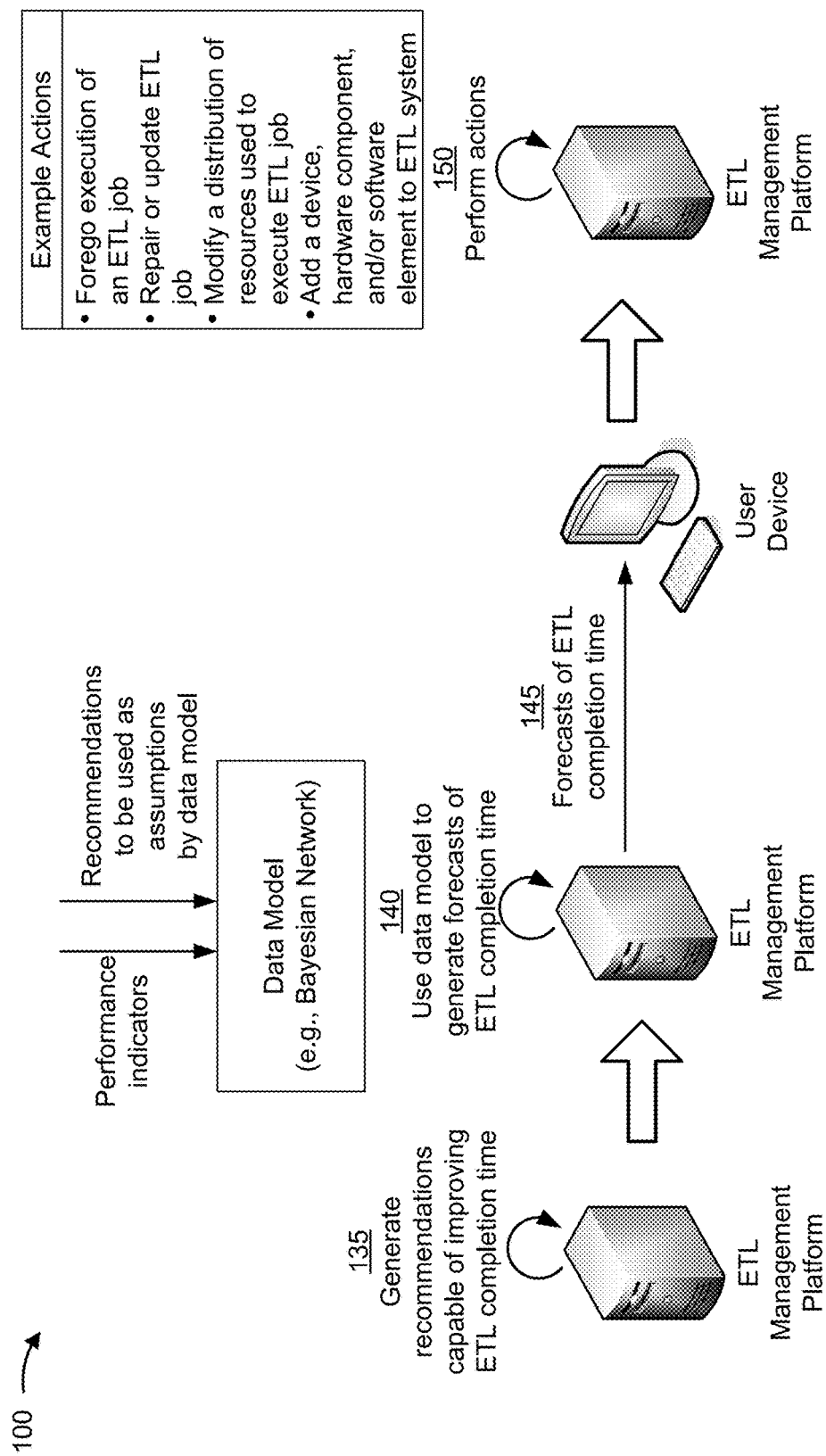

As shown in FIG. 1D, and by reference number 135, the ETL management platform may generate a set of recommendations that are capable of improving the ETL completion time. For example, the ETL management platform may generate a set of recommendations by analyzing the set of performance indicators with a set of rules. The set of recommendations may include a first recommendation to forego execution of one or more ETL jobs of the group of ETL jobs, a second recommendation to repair or update the one or more ETL jobs, a third recommendation to modify a distribution of resources that are to be used by the ETL system when executing the one or more ETL jobs, a fourth recommendation to add an additional device, an additional hardware component, and/or an additional software element to the ETL system, and/or the like.

In some implementations, the ETL management platform may generate a recommendation using a set of rules. For example, the ETL management platform may be configured with a set of rules that associate particular performance indicator values with particular recommendations.

As an example, the ETL management platform may be configured with a first rule that instructs the ETL management platform to generate the first recommendation to forego execution of one or more ETL jobs if the one or more ETL jobs are executed daily but not actually viewed daily by employees of the organization. Additionally, or alternatively, and provided as another example, the ETL management platform may be configured with a second rule that instructs the ETL management platform to generate the second recommendation to repair or update the one or more ETL jobs if a particular performance indicator value indicates that the one or more ETL jobs need to be repaired or updated (or if the ETL management platform separately identifies that the one or more ETL jobs need to be repaired or updated).

Additionally or alternatively, and provided as another example, the ETL management platform may be configured with a third rule that instructs the ETL management platform to generate the third recommendation to modify the distribution of resources of the ETL system if a particular performance indicator indicates that a first device or database is operating above a threshold performance level and a second device or database is operating below a threshold performance level. Additionally or alternatively, and provided as another example, the ETL management platform may be configured with a fourth rule that instructs the ETL management platform to generate the fourth recommendation to add an additional device, hardware component, and/or software element to the ETL system if the only way to satisfy the ETL completion time requested by the user is to add a new device (e.g., an additional cloud server), a new hardware component (e.g., an additional memory card), a new software element (e.g., an additional set of virtual resources).

The above rules are provided merely as an example. In practice, any type of rule may be implemented that is able to associate a particular network performance indicator value with a recommendation that may be implemented to improve the ETL completion time.

As shown by reference number 140, the ETL management platform may use the data model (e.g., the Bayesian Network) to generate the set of forecasts of the ETL completion time. For example, the ETL management platform may provide the set of performance indicators as input to the Bayesian Network to cause the Bayesian Network to update the set of probability tables and to generate a first forecast of the ETL completion time.

Additionally, or alternatively, the ETL management platform may generate an additional forecast by providing, as input to the Bayesian Network, the set of performance indicators and a particular recommendation, of the set of recommendations, to cause the Bayesian Network to update the set of probability tables and to generate a second forecast of the ETL completion time. The second forecast may be a forecast of what the ETL completion time would be were the particular recommendation to be implemented before the group of ETL jobs are executed. The ETL management platform may continue to generate additional forecasts until a forecast has been generated for each of the set of recommendations. In some cases, rather than generate recommendations to provide as input to the Bayesian Network, the ETL management platform may use the Bayesian Network to automatically generate a forecast for all (or some) possible combinations of recommendations that may be offered to improve the ETL completion time.

As shown by reference number 145, the ETL management platform may provide the set of forecasts of the ETL completion time to the user device. For example, the ETL management platform may provide the set of forecasts for display on a user interface of the ETL management program, such that a user may view the set of forecasts and/or may make decisions based on the set of forecasts.

In some implementations, the ETL management platform may provide the set of ETL completion times for display in association with particular recommendations if those particular recommendations are implemented. As such, the user may identify a particular recommendation that, if implemented, will provide a best-available forecasted ETL completion time.

As shown by reference number 150, the ETL management platform may perform one or more actions associated with improving the ETL completion time. For example, the ETL management platform may perform a first action to provide instructions to the ETL system to forego execution of an ETL job, a second action to provide instructions to the ETL system or to another device to repair or update the ETL job, a third action to provide instructions to the ETL system or to another device to modify a distribution of resources that are to be used when executing the ETL job, a fourth action to provide instructions to another device to add, to the ETL system, an additional device, an additional hardware component, or an additional software element, and/or the like. In this case, one or more of the above actions that include providing instructions may be provided using a communication interface, such as an application programming interface (API).

In some implementations, the ETL management platform may provide instructions to the ETL system to forego execution of an ETL job. The instructions may include an identifier for the ETL job, instructions indicating a duration with which to forego execution of the ETL job, and/or the like. In this way, the ETL management platform conserves processing resources and/or network resources by eliminating execution of ETL jobs that do not need to be executed during a subsequent run-time period (e.g., the following business day), while also ensuring that the ETL completion time satisfies the requested ETL completion time.

Additionally, or alternatively, the ETL management platform may provide instructions to the ETL system or to another device to repair or update the ETL job. The instructions may include an identifier for the ETL job, instructions indicating how to repair or update the ETL job (e.g., the instructions may include an executable that is to be launched to repair the ETL job, may describe a storage location where the executable may be located, etc.), and/or the like. In this way, the ETL management platform conserves processing resources and/or network resources that might otherwise be used to perform error correction procedures after the ETL job malfunctions, conserves processing resources and/or network resources that would be used to re-execute the ETL job after the malfunction was corrected, and/or the like.

Additionally, or alternatively, the ETL management platform may provide instructions to the ETL system or to another device to modify a distribution of resources that are to be used when executing the ETL job. The instructions may include an identifier for the ETL job, instructions indicating a type of resource to modify (e.g., a cloud resource, a virtual resource, etc.), an amount of the resource to modify, a reason for modifying the resource, and/or the like. In this way, the ETL management platform efficiently and effectively utilizes resources of the ETL system. Furthermore, the ETL management platform conserves processing resources and/or network resources that might otherwise be used to perform error correction procedures for the ETL job if lack of resources caused an error while the ETL job was being executed, conserves processing resources and/or network resources that would be used to re-execute the ETL job after the error was corrected, and/or the like.

Additionally, or alternatively, the ETL management platform may provide instructions to one or more other devices to add, to the ETL system, an additional device, an additional hardware component, an additional software element, and/or the like. The instructions may include an identifier for the ETL job, instructions indicating what is to be added (e.g., the additional device, the additional hardware component, the additional software element), instructions indicating where the addition is to be made, instructions indicating how the addition is to be made, and/or the like. By orchestrating the addition of additional resources to the ETL system, the ETL management platform ensures that the ETL completion time satisfies the ETL completion time requested by the organization.

In some implementations, the ETL management platform may automatically perform one or more actions that are described above as being performed by other devices. For example, the ETL management platform may automatically modify a number of ETL jobs that are to execute, automatically modify a distribution of resources of the ETL system, automatically update, install, uninstall, or repair a new software component to the ETL system, and/or the like.

By forecasting the ETL completion time, the ETL management platform is able to identify when preventative actions need to be taken to ensure that the group of ETL jobs execute within the requested ETL completion time. Furthermore, by identifying issues that may prevent the group of ETL jobs from executing within the requested ETL completion time, the ETL management platform is able to perform preventative actions that improve the ETL completion time and conserve processing resources and/or network resources that might otherwise be used to perform error correction procedures on particular ETL jobs, re-execute ETL jobs that failed an initial execution, and/or the like.

As indicated above, FIGS. 1A-1D are provided merely as an example. Other examples are possible and may differ from what was described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of example implementations 100 may perform one or more functions described as being performed by another set of devices of example implementations 100.

Figure 2:
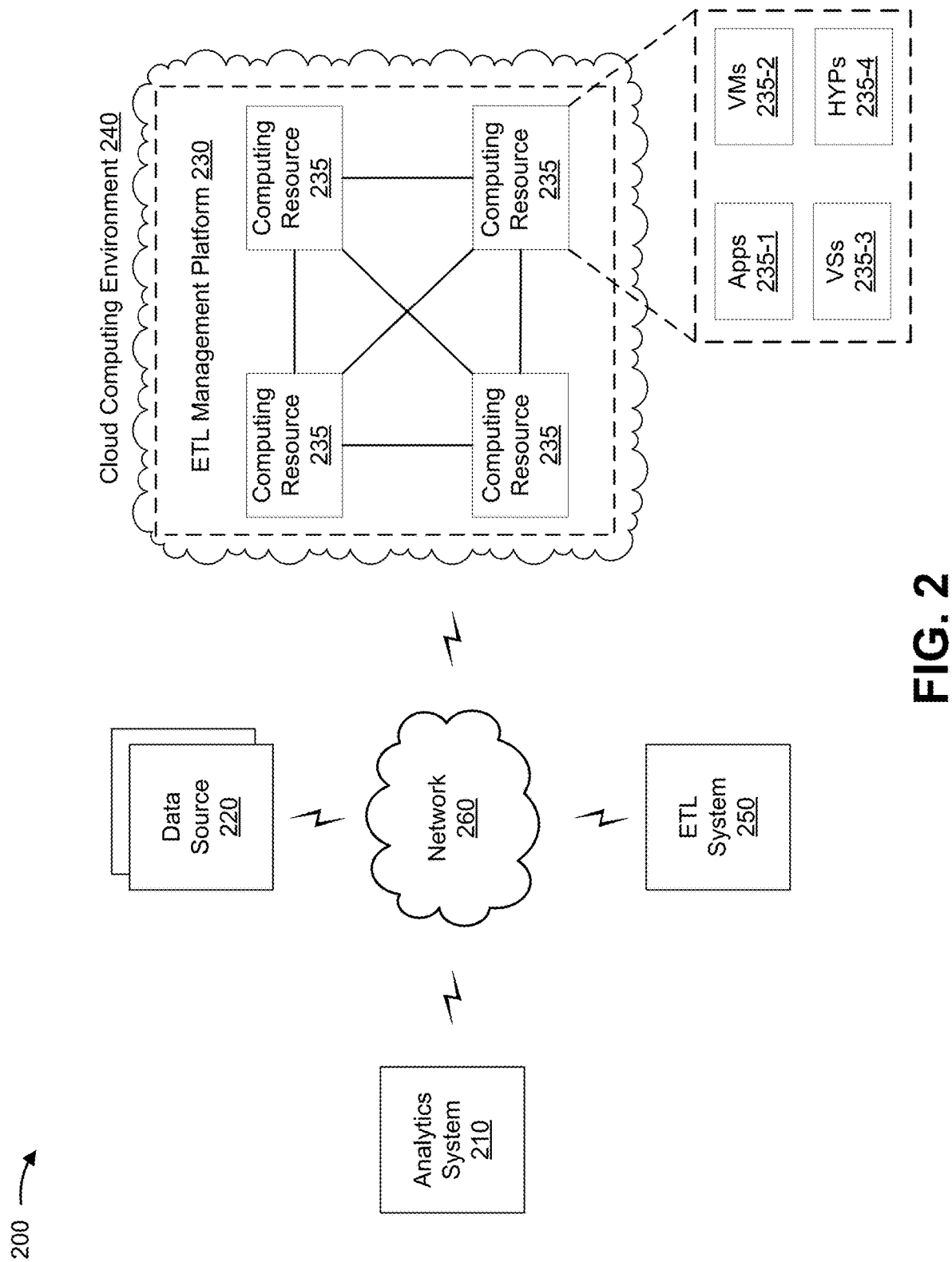
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an analytics system 210, a data source 220, an extract transform load (ETL) management platform 230 hosted within a cloud computing environment 240, an ETL system 250, and/or a network 260. Devices of environment 200 may interconnect via wired connections, wireless connections, or a combination of wired and wireless connections.

Analytics system 210 includes one or more devices capable of receiving, storing, generating, determining, and/or providing information associated with an ETL system, such as ETL system 250. For example, analytics system 210 may include a computing device (e.g., a desktop computer, a laptop computer, a tablet computer, a handheld computer, a server device, etc.), a mobile phone (e.g., a smart phone, a radiotelephone, etc.), or a similar device. In some implementations, analytics system 210 may include a group of devices capable of accessing an ETL management program. In some implementations, analytics system 210 may include an interface for requesting a set of forecasts of an ETL completion time and/or for displaying the set of forecasts of the ETL completion time.

Data source 220 includes one or more devices capable of receiving, storing, generating, determining, and/or providing information associated with an ETL system. For example, data source 220 may include a server device or a group of server devices.

In some implementations, data source 220 may receive organization data associated with an organization and may store the organization data as historical organization data. In some implementations, data source 220 may receive source data from ETL system 250 and may store the source data as historical source data. In some implementations, data source 220 may receive performance indicators from ETL system 250 and may store the performance indicators as historical performance indicators. In some implementations, data source 220 may receive ETL completion time data and may store the ETL completion time data as historical ETL completion time data.

ETL management platform 230 includes one or more devices capable of receiving, storing, generating, determining, and/or providing information associated with an ETL system. For example, ETL management platform 230 may include a server device (e.g., a host server, a web server, an application server, etc.), a data center device, or a similar device.

In some implementations, as shown, ETL management platform 230 may be hosted in cloud computing environment 240. Notably, while implementations described herein describe ETL management platform 230 as being hosted in cloud computing environment 240, in some implementations, ETL management platform 230 may not be cloud-based (i.e., may be implemented outside of a cloud computing environment) or may be partially cloud-based.

Cloud computing environment 240 includes an environment that hosts ETL management platform 230. Cloud computing environment 240 may provide computation, software, data access, storage, etc. services that do not require end-user knowledge of a physical location and configuration of system(s) and/or device(s) that hosts ETL management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host ETL management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by analytics system 210 and/or ETL system 250. Application 235-1 may eliminate a need to install and execute the software applications on these devices. For example, application 235-1 may include software associated with ETL management platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., analytics system 210 and/or ETL system 250), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

ETL system 250 includes one or more devices capable of receiving, storing, generating, determining, and/or providing source data and/or a set of performance indicators. For example, ETL system 250 may include a server device or a group of server devices. In some implementations, ETL system 250 may receive organization data from data source 220 and may execute a group of ETL jobs to transform the organization data for analytics system 210. In some implementations, ETL system 250 may provide source data and/or performance indicators to analytics system 210 and/or data source 220. In some implementations, ETL system 250 may receive instructions from ETL management platform 230 to modify one or more cloud resources, to replace or update one or more ETL jobs, and/or the like.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
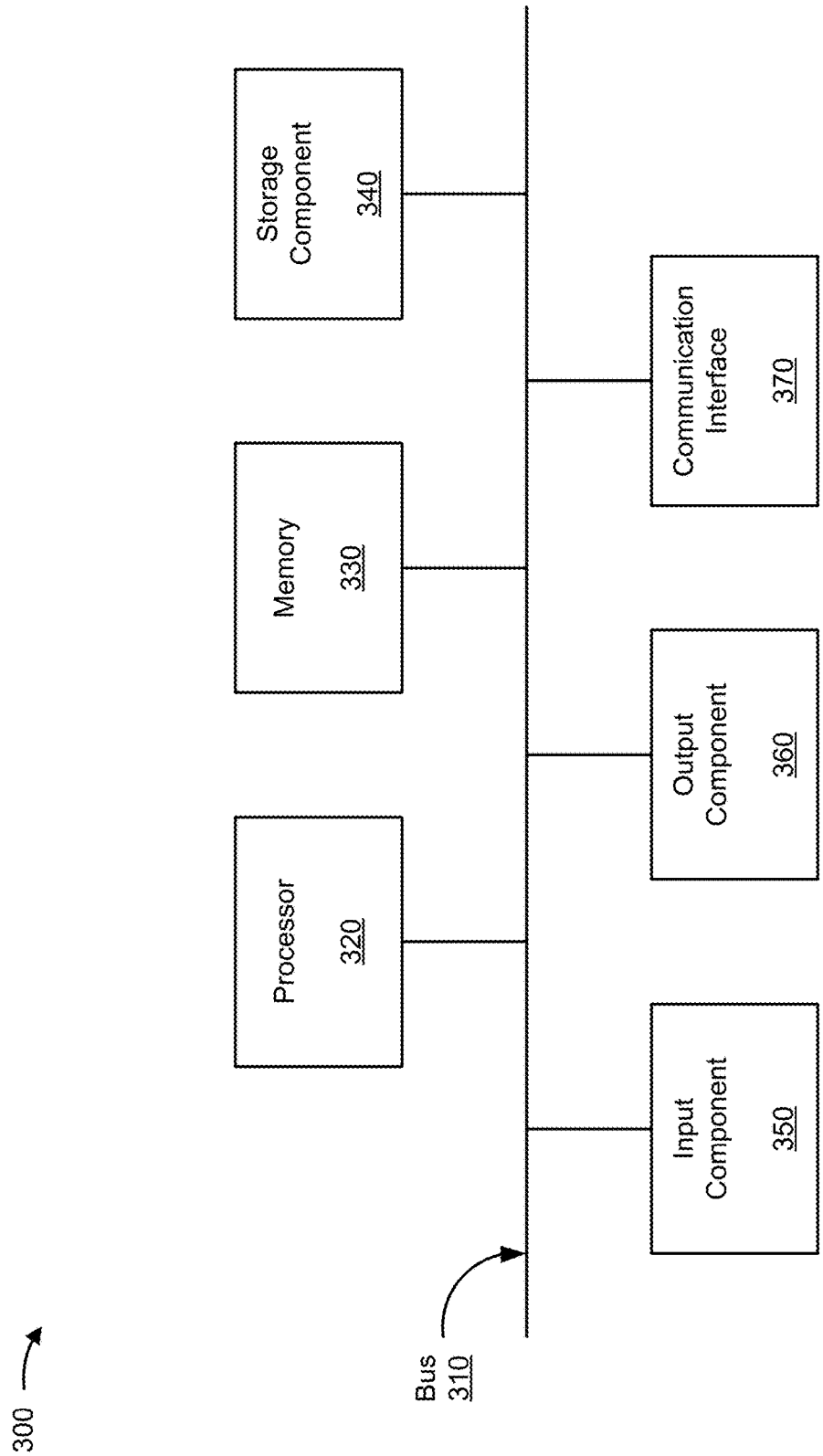
FIG. 3 is a diagram of example components of one or more devices of FIG. 2.

FIG. 3 is a diagram of example components of a device 300. Device 300 may correspond to analytics system 210, data source 220, ETL management platform 230, and/or ETL system 250. In some implementations, analytics system 210, data source 220, ETL management platform 230, and/or ETL system 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
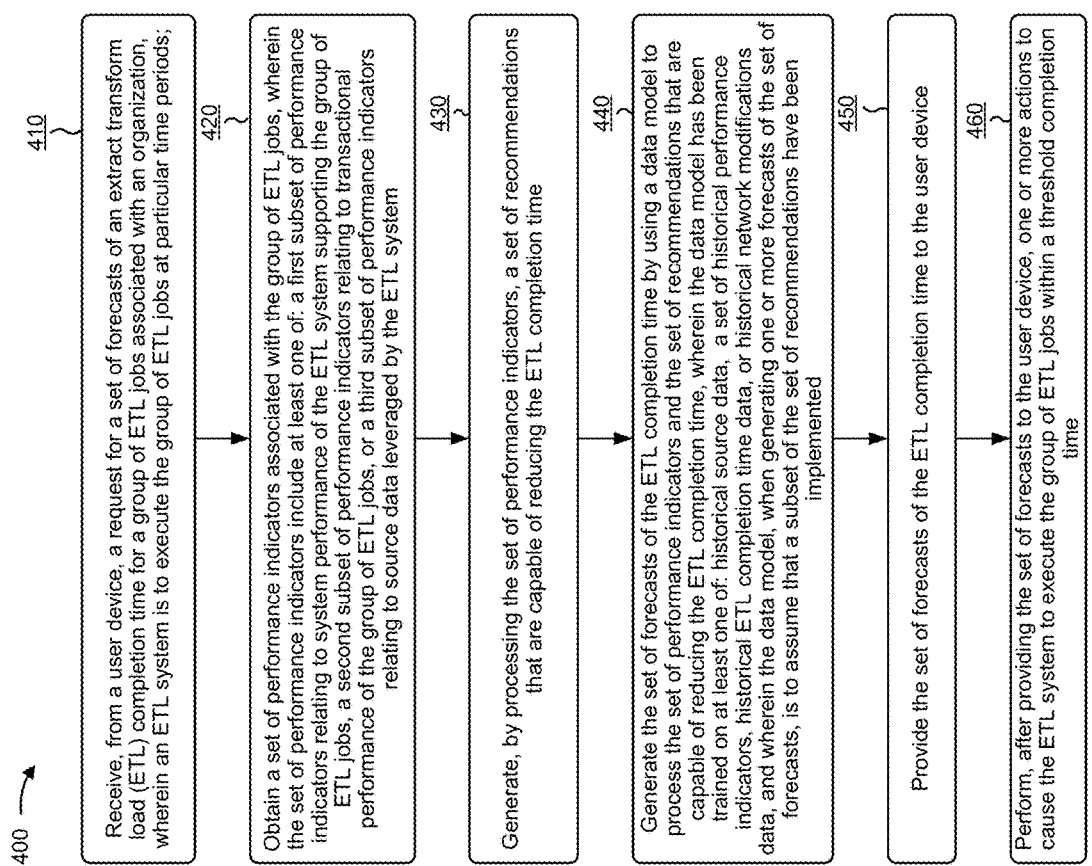

FIG. 4 is a flow chart of an example process 400 for using machine learning to generate a set of forecasts of an extract transform load (ETL) completion time for a group of ETL jobs, and for performing one or more actions to ensure that the ETL completion time satisfies a requested ETL completion time. In some implementations, one or more process blocks of FIG. 4 may be performed by an ETL management platform (e.g., ETL management platform 230). In some implementations, one or more process blocks of FIG. 4 may be performed by another device or a group of devices separate from or including the ETL management platform, such as an analytics system (e.g., analytics system 210), a data source (e.g., data source 220), and/or an ETL system (e.g., ETL system 250).

As shown in FIG. 4, process 400 may include receiving, from a user device, a request for a set of forecasts of an extract transform load (ETL) completion time for a group of ETL jobs associated with an organization, wherein an ETL system is to execute the group of ETL jobs at particular time periods (block 410). For example, the ETL management platform (e.g., ETL management platform 230, using computing resource 235, processor 320, input component 350, communication interface 370, etc.) may receive, from a user device (e.g., that is part of analytics system 210), a request for a set of forecasts of an ETL completion time for a group of ETL jobs associated with the organization, as described above with regard to FIGS. 1A-1D. In some implementations, the ETL system (e.g., ETL system 250) may execute the group of ETL jobs at particular time periods.

As further shown in FIG. 4, process 400 may include obtaining a set of performance indicators associated with the group of ETL jobs, wherein the set of performance indicators include at least one of: a first subset of performance indicators relating to system performance of the ETL system supporting the group of ETL jobs, a second subset of performance indicators relating to transactional performance of the group of ETL jobs, or a third subset of performance indicators relating to source data leveraged by the ETL system (block 420). For example, the ETL management platform (e.g., ETL management platform 230, using computing resource 235, processor 320, input component 350, output component 360, communication interface 370, etc.) may obtain a set of performance indicators associated with the group of ETL jobs, as described above with regard to FIGS. 1A-1D. In some implementations, the set of performance indicators may include a first subset of performance indicators relating to system performance of the ETL system supporting the group of ETL jobs, a second subset of performance indicators relating to transactional performance of the group of ETL jobs, a third subset of performance indicators relating to source data generated from the group of ETL jobs, and/or the like.

As further shown in FIG. 4, process 400 may include generating, by processing the set of performance indicators, a set of recommendations that are capable of reducing the ETL completion time (block 430). For example, the ETL management platform (e.g., ETL management platform 230, using computing resource 235, processor 320, etc.) may generate, by processing the set of performance indicators, a set of recommendations that are capable of reducing the ETL completion time, as described above with regard to FIGS. 1A-1D.

As further shown in FIG. 4, process 400 may include generating the set of forecasts of the ETL completion time by using a data model to process the set of performance indicators and the set of recommendations that are capable of reducing the ETL completion time, wherein the data model has been trained on at least one of: historical source data, a set of historical performance indicators, historical ETL completion time data, or historical network modifications data, and wherein the data model, when generating one or more forecasts of the set of forecasts, is to assume that a subset of the set of recommendations have been implemented (block 440). For example, the ETL management platform (e.g., ETL management platform 230, using computing resource 235, processor 320, etc.) may generate the set of forecasts of the ETL completion time by using a data model to process the set of performance indicators and the set of recommendations that are capable of reducing the ETL completion time, as described above with regard to FIGS. 1A-1D.

In some implementations, the data model may be trained on historical source data, a set of historical performance indicators, historical ETL completion time data, and/or historical network modifications data. In some implementations, the data model, when generating one or more forecasts of the set of forecasts, is to assume that a subset of the set of recommendations have been implemented.

As further shown in FIG. 4, process 400 may include providing the set of forecasts of the ETL completion time to the user device (block 450). For example, the ETL management platform (e.g., ETL management platform 230, using computing resource 235, processor 320, output component 360, communication interface 370, etc.) may provide the set of forecasts of the ETL completion time to the user device (e.g., which may be part of analytics system 210), as described above with regard to FIGS. 1A-1D.

As further shown in FIG. 4, process 400 may include performing, after providing the set of forecasts to the user device, one or more actions to cause the ETL system to execute the group of ETL jobs within a threshold completion time (block 460). For example, the ETL management platform (e.g., ETL management platform 230, using computing resource 235, processor 320, input component 350, output component 360, communication interface 370, etc.) may perform, after providing the set of forecasts to the user device, one or more actions to cause the ETL system (e.g., ETL system 250) to execute the group of ETL jobs within a threshold completion time, as described above with regard to FIGS. 1A-1D.

Process 400 may include additional implementations, such as any single implementation or any combination of implementations described below and/or in connection with one or more other processes described elsewhere herein.

In some implementations, the ETL management platform may execute one or more filtering techniques to remove one or more subsets of performance indicators, from the set of performance indicators, based on a set of exceptions. In some implementations, the set of exceptions may identify outlier data points within the set of performance indicators to prevent the outlier data points from reducing accuracy of the data model.

In some implementations, the set of recommendations may include a first recommendation to forego execution of one or more ETL jobs of the group of ETL jobs, a second recommendation to repair or update the one or more ETL jobs, a third recommendation to modify a distribution of resources that are to be used by the ETL system when executing the one or more ETL jobs, a fourth recommendation to add an additional device, an additional component, or an additional element to the ETL system, and/or the like.

In some implementations, the data model may be capable of generating forecasts for different ETL jobs that are executed by different types of ETL systems. In some implementations, the data model may be a Bayesian Network.

In some implementations, the ETL management platform may receive, from the user device and before performing the one or more actions, an indication that a first forecast, of the set of forecasts, has been selected by the user device. In some implementations, the first forecast may have been generated based on an assumption that a first recommendation of the subset of the set of recommendations had been implemented. In some implementations, the ETL management platform, when performing the one or more actions, may perform a particular action associated with implementing the first recommendation based on receiving the indication that the first forecast has been selected by the user device.

In some implementations, the ETL management platform may perform an action, of the one or more actions, to implement a recommendation of the set of recommendations. In some implementations, the action may be a first action to provide instructions to the ETL system to forego execution of one or more ETL jobs of the group of ETL jobs, a second action to provide instructions to the ETL system or to another device to repair or update the one or more ETL jobs, a third action to provide instructions to the ETL system or to the other device to modify a distribution of resources that are to be used when executing the one or more ETL jobs, a fourth action to provide instructions to the other device to add an additional device, an additional component, or an additional element to the ETL system, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for using machine learning to generate a set of forecasts of an extract transform load (ETL) completion time for a group of ETL jobs, and for performing one or more actions to ensure that the ETL completion time satisfies a requested ETL completion time. In some implementations, one or more process blocks of FIG. 5 may be performed by an ETL management platform (e.g., ETL management platform 230). In some implementations, one or more process blocks of FIG. 5 may be performed by another device or a group of devices separate from or including the ETL management platform, such as an analytics system (e.g., analytics system 210), a data source (e.g., data source 220), and/or an ETL system (e.g., ETL system 250).

As shown in FIG. 5, process 500 may include receiving, from a user device, a request for a set of forecasts of an extract transform load (ETL) completion time for a group of ETL jobs associated with an organization (block 510). For example, the ETL management platform (e.g., ETL management platform 230, using computing resource 235, processor 320, input component 350, communication interface 370, etc.) may receive, from a user device (e.g., that is part of analytics system 210), a request for a set of forecasts of an ETL completion time for a group of ETL jobs associated with an organization, as described above with regard to FIGS. 1A-1D.

As further shown in FIG. 5, process 500 may include obtaining a set of performance indicators associated with the group of ETL jobs, wherein the set of performance indicators include at least one of: a first subset of performance indicators relating to system performance of an ETL system supporting the group of ETL jobs, a second subset of performance indicators relating to transactional performance of the group of ETL jobs, or a third subset of performance indicators relating to source leveraged by the ETL system (block 520). For example, the ETL management platform (e.g., ETL management platform 230, using computing resource 235, processor 320, input component 350, output component 360, communication interface 370, etc.) may obtain a set of performance indicators associated with the group of ETL jobs, as described above with regard to FIGS. 1A-1D. In some implementations, the set of performance indicators may include a first subset of performance indicators relating to system performance of an ETL system supporting the group of ETL jobs, a second subset of performance indicators relating to transactional performance of the group of ETL jobs, a third subset of performance indicators relating to source data generated from the group of ETL jobs, and/or the like.

As further shown in FIG. 5, process 500 may include filtering the set of performance indicators using one or more filtering techniques (block 530). For example, the ETL management platform (e.g., ETL management platform 230, using computing resource 235, processor 320, etc.) may filter the set of performance indicators using one or more filtering techniques, as described above with regard to FIGS. 1A-1D.

As further shown in FIG. 5, process 500 may include generating the set of forecasts of the ETL completion time by using a data model to process at least one of: the set of performance indicators, or a set of assumptions associated with a set of recommendations for reducing the ETL completion time (block 540). For example, the ETL management platform (e.g., ETL management platform 230, using computing resource 235, processor 320, etc.) may generate the set of forecasts of the ETL completion time by using a data model to process at least one of: the set of performance indicators and/or a set of recommendations for reducing the ETL completion time, as described above with regard to FIGS. 1A-1D.

As further shown in FIG. 5, process 500 may include providing the set of forecasts of the ETL completion time to the user device (block 550). For example, the ETL management platform (e.g., ETL management platform 230, using computing resource 235, processor 320, output component 360, communication interface 370, etc.) may provide the set of forecasts of the ETL completion time to the user device (e.g., which may be part of analytics system 210), as described above with regard to FIGS. 1A-1D.

As further shown in FIG. 5, process 500 may include performing, after providing the set of forecasts to the user device, one or more actions that cause the ETL system to execute the group of ETL jobs within a threshold completion time (block 560). For example, the ETL management platform (e.g., ETL management platform 230, using computing resource 235, processor 320, input component 350, output component 360, communication interface 370, etc.) may perform, after providing the set of forecasts to the user device, one or more actions that cause the ETL system to execute the group of ETL jobs within a threshold completion time, as described above with regard to FIGS. 1A-1D.

Process 500 may include additional implementations, such as any single implementation or any combination of implementations described below and/or in connection with one or more other processes described elsewhere herein.

In some implementations, data model may be capable of generating forecasts for the group of ETL jobs while the group of ETL jobs are executed by different types of ETL systems.

In some implementations, the ETL management platform may, while filtering the set of performance indicators, execute the one or more filtering techniques to remove one or more subsets of performance indicators from the set of performance indicators based on a set of exceptions. In some implementations, the set of exceptions may include a first exception to remove a particular performance indicator if the particular performance indicator is associated with an ETL job that generates a threshold amount of the source data, a second exception to remove the particular performance indicator if the particular performance indicator is associated with an ETL job that is being supported by a new device, a new component, or a new element within the ETL system, and/or a third exception to modify the particular performance indicator to account for seasonal variations associated with the particular performance indicator.

In some implementations, the ETL management platform may generate, by processing the set of performance indicators, the set of recommendations that are capable of reducing the ETL completion time. In some implementations, the ETL management platform may generate the set of forecasts by using the data model to process the set of performance indicators and the set of assumptions that are associated with the set of recommendations.

In some implementations, the data model may be a Bayesian Network. In some implementations, the ETL management platform may, while generating the set of forecasts, provide the set of performance indicators as input to the Bayesian Network to cause the Bayesian Network to: update a set of probability tables that are associated with a set of nodes of the Bayesian Network, and generate a first forecast, of the set of forecasts, by executing a scoring technique to process the set of probability tables. In some implementations, the set of probability tables may identify a set of probabilities of the set of nodes being in particular states. In some implementations, the set of probabilities may be based on the set of performance indicators.

In some implementations, the data model may be a Bayesian Network. In some implementations, the ETL management platform may, while generating the set of forecasts, provide the set of performance indicators and a first recommendation of the set of recommendations as input to the Bayesian Network to cause the Bayesian Network to: update a set of probability tables that are associated with a set of nodes of the Bayesian Network, and generate a first forecast, of the set of forecasts, by executing a scoring technique to process the set of probability tables. In some implementations, the set of probability tables for the set of nodes may identify a set of probabilities of the set of nodes being in particular states. In some implementations, the set of probabilities may be based on the set of performance indicators and an assumption that the first recommendation has been implemented.

In some implementations, the ETL management platform may, while generating the set of forecasts, generate a first forecast of the ETL completion time based on the set of performance indicators. In some implementations, the first forecast of the ETL completion time may not be within the threshold completion time. In some implementations, the ETL management platform may, while performing the one or more actions, automatically perform particular actions associated with implementing a particular recommendation that was used as an assumption when generating the first forecast.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for using machine learning to generate a set of forecasts of an extract transform load (ETL) completion time for a group of ETL jobs, and for performing one or more actions to ensure that the ETL completion time satisfies a requested ETL completion time. In some implementations, one or more process blocks of FIG. 6 may be performed by an ETL management platform (e.g., ETL management platform 230). In some implementations, one or more process blocks of FIG. 6 may be performed by another device or a group of devices separate from or including the ETL management platform, such as an analytics system (e.g., analytics system 210), a data source (e.g., data source 220), and/or an ETL system (e.g., ETL system 250).

As shown in FIG. 6, process 600 may include receiving, from a user device, a request for a set of forecasts of an extract transform load (ETL) completion time for a group of ETL jobs associated with an organization (block 610). For example, the ETL management platform (e.g., ETL management platform 230, using computing resource 235, processor 320, input component 350, communication interface 370, etc.) may receive, from a user device (e.g., which may be part of analytics system 210), a request for a set of forecasts of an extract transform load (ETL) completion time for a group of ETL jobs associated with an organization, as described above with regard to FIGS. 1A-1D.

As further shown in FIG. 6, process 600 may include obtaining a set of performance indicators associated with the group of ETL jobs, wherein the set of performance indicators include at least one of: a first subset of performance indicators relating to system performance of an ETL system supporting the group of ETL jobs, a second subset of performance indicators relating to transactional performance of the group of ETL jobs, or a third subset of performance indicators relating to source data leveraged by the ETL system (block 620). For example, the ETL management platform (e.g., ETL management platform 230, using computing resource 235, processor 320, input component 350, output component 360, communication interface 370, etc.) may obtain a set of performance indicators associated with the group of ETL jobs, as described above with regard to FIGS. 1A-1D. In some implementations, the set of performance indicators may include a first subset of performance indicators relating to system performance of an ETL system supporting the group of ETL jobs, a second subset of performance indicators relating to transactional performance of the group of ETL jobs, and/or a third subset of performance indicators relating to source data generated from the group of ETL jobs.

As shown in FIG. 6, process 600 may include filtering the set of performance indicators using one or more filtering techniques (block 630). For example, the ETL management platform (e.g., ETL management platform 230, using computing resource 235, processor 320, etc.) may filter the set of performance indicators using one or more filtering techniques, as described above with regard to FIGS. 1A-1D.

As further shown in FIG. 6, process 600 may include generating the set of forecasts of the ETL completion time by using a data model to process the set of performance indicators, wherein the data model has been trained on at least one of: historical source data, a set of historical performance indicators, or historical ETL completion time data (block 640). For example, the ETL management platform (e.g., ETL management platform 230, using computing resource 235, processor 320, etc.) may generate the set of forecasts of the ETL completion time by using a data model to process the set of performance indicators, as described above with regard to FIGS. 1A-1D. In some implementations, the data model may be trained on historical source data, a set of historical performance indicators, and/or historical ETL completion time data.

As shown in FIG. 6, process 600 may include providing the set of forecasts of the ETL completion time to the user device (block 650). For example, the ETL management platform (e.g., ETL management platform 230, using computing resource 235, processor 320, output component 360, communication interface 370, etc.) may provide the set of forecasts of the ETL completion time to the user device, as described above with regard to FIGS. 1A-1D.

As further shown in FIG. 6, process 600 may include performing, after providing the set of forecasts to the user device, one or more actions if the set of forecasts do not include a particular forecast of the ETL completion time that satisfies a threshold completion time (block 660). For example, the ETL management platform (e.g., ETL management platform 230, using computing resource 235, processor 320, input component 350, output component 360, communication interface 370, etc.) may perform, after providing the set of forecasts to the user device, one or more actions if the set of forecasts do not include a particular forecast of the ETL completion time that satisfies a threshold completion time, as described above with regard to FIGS. 1A-1D.

Process 600 may include additional implementations, such as any single implementation or any combination of implementations described below and/or in connection with one or more other processes described elsewhere herein.

In some implementations, the ETL management platform may generate, by processing the set of performance indicators that have been filtered, a set of recommendations that are capable of reducing the ETL completion time. In some implementations, the ETL management platform may generate the set of forecasts using the set of performance indicators and a set of assumptions associated with the set of recommendations for reducing the ETL completion time.

In some implementations, the data model may be capable of generating forecasts for different ETL jobs that are executed by different ETL systems. In some implementations, the data model may be a Bayesian Network.

In some implementations, the ETL management platform may, while generating the set of forecasts, provide the set of performance indicators as input to the data model to cause the data model to update a set of probability tables that are associated with a set of nodes of the data model, and to generate a first forecast, of the set of forecasts, by executing a scoring technique to process the set of probability tables.

In some implementations, the ETL management platform may, while performing the one or more actions, determine that the set of forecasts do not include the forecast with the ETL completion time that satisfies the threshold completion time. In some implementations, the ETL management platform may automatically perform the one or more actions based on determining that the set of forecasts do not include the forecast with the ETL completion time that satisfies the threshold completion time. In some implementations, the one or more actions may cause the ETL system to execute the group of ETL jobs within the threshold completion time.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

By forecasting ETL completion time, the ETL management platform is able to identify when preventative actions need to be taken to ensure that the group of ETL jobs execute within a requested completion time. In this way, the ETL management platform conserves processing resources and/or network resources that might otherwise be used to obtain and transform the organization data after the requested completion time (e.g., which may be too late for analysts of the organization to use the transformed organization data to derive valuable insights). Furthermore, by identifying issues that may prevent the group of ETL jobs from executing within the requested completion time, the ETL management platform is able to perform preventative actions that improve the ETL completion time and conserve processing resources and/or network resources that might otherwise be used to perform error correction procedures on particular ETL jobs, re-execute ETL jobs that failed an initial execution, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, operatively connected to the one or more memories, to:
receive, from a user device, a request for a set of forecasts of an extract transform load (ETL) completion time for a group of ETL jobs associated with an organization,
wherein an ETL system is to execute the group of ETL jobs at particular time periods;
obtain a set of performance indicators associated with the group of ETL jobs,
wherein the set of performance indicators include at least one of:
a first subset of performance indicators relating to system performance of the ETL system supporting the group of ETL jobs,
a second subset of performance indicators relating to transactional performance of the group of ETL jobs, or
a third subset of performance indicators relating to source data generated from the group of ETL jobs;
execute one or more filtering techniques to remove one or more subsets of performance indicators, from the set of performance indicators, based on a set of exceptions,
wherein the set of exceptions are to identify outlier data points within the set of performance indicators to prevent the outlier data points from reducing accuracy of a data model;
generate, by processing the set of performance indicators, a set of recommendations that are capable of reducing the ETL completion time;
generate the set of forecasts of the ETL completion time by using the data model to process the set of performance indicators and the set of recommendations that are capable of reducing the ETL completion time,
wherein the data model has been trained on at least one of:
historical source data,
a set of historical performance indicators,
historical ETL completion time data, or
historical network modifications data, and
wherein the data model, when generating one or more forecasts of the set of forecasts, is to assume that a subset of the set of recommendations have been implemented;
provide the set of forecasts of the ETL completion time to the user device; and
perform, after providing the set of forecasts to the user device, one or more actions to cause the ETL system to execute the group of ETL jobs within a threshold completion time.

2. The device of claim 1, wherein the set of recommendations include at least one of:
a first recommendation to forego execution of one or more ETL jobs of the group of ETL jobs,
a second recommendation to repair or update the one or more ETL jobs,
a third recommendation to modify a distribution of resources that are to be used by the ETL system when executing the one or more ETL jobs, or
a fourth recommendation to add an additional device, an additional component, or an additional element to the ETL system.

3. The device of claim 1, wherein the data model is capable of generating forecasts for different ETL jobs that are executed by different types of ETL systems.

4. The device of claim 1, wherein the data model is a Bayesian Network.

5. The device of claim 1, wherein the one or more processors are further to:
receive, from the user device and before performing the one or more actions, an indication that a first forecast, of the set of forecasts, has been selected by the user device,
wherein the first forecast was generated based on an assumption that a first recommendation of the subset of the set of recommendations had been implemented; and
wherein the one or more processors, when performing the one or more actions, are to:
perform a particular action associated with implementing the first recommendation based on receiving the indication that the first forecast has been selected by the user device.

6. The device of claim 1, wherein the one or more processors, when performing the one or more actions, are to:
perform an action, of the one or more actions, to implement a recommendation of the set of recommendations, wherein the action is:
a first action to provide instructions to the ETL system to forego execution of one or more ETL jobs of the group of ETL jobs,
a second action to provide instructions to the ETL system or to another device to repair or update the one or more ETL jobs,
a third action to provide instructions to the ETL system or to the other device to modify a distribution of resources that are to be used when executing the one or more ETL jobs, or
a fourth action to provide instructions to the other device to add an additional device, an additional component, or an additional element to the ETL system.

7. A method, comprising:
receiving, by a device and from a user device, a request for a set of forecasts of an extract transform load (ETL) completion time for a group of ETL jobs associated with an organization;
obtaining, by the device, a set of performance indicators associated with the group of ETL jobs,
wherein the set of performance indicators include at least one of:
a first subset of performance indicators relating to system performance of an ETL system supporting the group of ETL jobs,
a second subset of performance indicators relating to transactional performance of the group of ETL jobs, or
a third subset of performance indicators relating to source data generated from the group of ETL jobs;
filtering, by the device, the set of performance indicators by executing one or more filtering techniques to remove one or more subsets of performance indicators, from the set of performance indicators, based on a set of exceptions,
wherein the set of exceptions are to identify outlier data points within the set of performance indicators to prevent the outlier data points from reducing accuracy of a data model;
generating, by the device, the set of forecasts of the ETL completion time by using the data model to process at least one of:
the set of performance indicators, or
a set of assumptions associated with a set of recommendations for reducing the ETL completion time;
providing, by the device, the set of forecasts of the ETL completion time to the user device; and
performing, by the device and after providing the set of forecasts to the user device, one or more actions that cause the ETL system to execute the group of ETL jobs within a threshold completion time.

8. The method of claim 7, wherein the data model is capable of generating forecasts for the group of ETL jobs while the group of ETL jobs are executed by different ETL systems.

9. The method of claim 7,
wherein the set of exceptions include at least one of:
a first exception to remove a particular performance indicator if the particular performance indicator is associated with a first ETL job that generates a threshold amount of the source data,
a second exception to remove the particular performance indicator if the particular performance indicator is associated with a second ETL job that is being supported by a new device, a new component, or a new element within the ETL system, or
a third exception to modify the particular performance indicator to account for seasonal variations associated with the particular performance indicator.

10. The method of claim 7, further comprising:
generating, by processing the set of performance indicators, the set of recommendations that are capable of reducing the ETL completion time; and
wherein generating the set of forecasts comprises:
generating the set of forecasts by using the data model to process the set of performance indicators and the set of assumptions that are associated with the set of recommendations.

11. The method of claim 7, wherein the data model is a Bayesian Network; and wherein generating the set of forecasts comprises:
providing the set of performance indicators as input to the Bayesian Network to cause the Bayesian Network to:
update a set of probability tables that are associated with a set of nodes of the Bayesian Network,
wherein the set of probability tables identify a set of probabilities of the set of nodes being in particular states, and
wherein the set of probabilities are based on the set of performance indicators, and
generate a first forecast, of the set of forecasts, by executing a scoring technique to process the set of probability tables.

12. The method of claim 7, wherein the data model is a Bayesian Network; and wherein generating the set of forecasts comprises:
providing the set of performance indicators and a first recommendation of the set of recommendations as input to the Bayesian Network to cause the Bayesian Network to:
update a set of probability tables that are associated with a set of nodes of the Bayesian Network,
wherein the set of probability tables for the set of nodes identify a set of probabilities of the set of nodes being in particular states, and
wherein the set of probabilities are based on:
the set of performance indicators, and
an assumption that the first recommendation has been implemented, and
generate a first forecast, of the set of forecasts, by executing a scoring technique to process the set of probability tables.

13. The method of claim 7, wherein generating the set of forecasts of the ETL completion time comprises:
generating a first forecast of the ETL completion time based on the set of performance indicators,
wherein the first forecast of the ETL completion time is not within the threshold completion time; and
wherein performing the one or more actions comprises:
automatically performing particular actions associated with implementing a particular recommendation that was used as an assumption when generating the first forecast.

14. A non-transitory computer-readable medium storing instructions, the instructions comprising:
one or more instructions that, when executed by one or more processors, cause the one or more processors to:
receive, from a user device, a request for a set of forecasts of an extract transform load (ETL) completion time for a group of ETL jobs associated with an organization;
obtain a set of performance indicators associated with the group of ETL jobs,
wherein the set of performance indicators include at least one of:
a first subset of performance indicators relating to system performance of an ETL system supporting the group of ETL jobs,
a second subset of performance indicators relating to transactional performance of the group of ETL jobs, or
a third subset of performance indicators relating to source data generated from the ETL group of jobs;
filter the set of performance indicators by executing one or more filtering techniques to remove one or more subsets of performance indicators, from the set of performance indicators, based on a set of exceptions,
wherein the set of exceptions are to identify outlier data points within the set of performance indicators to prevent the outlier data points from reducing accuracy of a data model;
generate the set of forecasts of the ETL completion time by using the data model to process the set of performance indicators,
wherein the data model has been trained on at least one of:
historical source data, or
a set of historical performance indicators;
provide the set of forecasts of the ETL completion time to the user device; and
perform, after providing the set of forecasts to the user device, one or more actions if the set of forecasts do not include a particular forecast of the ETL completion time that satisfies a threshold completion time.

15. The non-transitory computer-readable medium of claim 14, wherein the one or more instructions, when executed by the one or more processors, further cause the one or more processors to:
generate, by processing the set of performance indicators that have been filtered, a set of recommendations that are capable of reducing the ETL completion time; and
wherein the one or more instructions, that cause the one or more processor to generate the set of forecasts of the ETL completion time, cause the one or more processors to:
generate the set of forecasts using the set of performance indicators and a set of assumptions associated with the set of recommendations for reducing the ETL completion time.

16. The non-transitory computer-readable medium of claim 14, wherein the data model is capable of generating forecasts for different ETL jobs that are executed by different ETL systems.

17. The non-transitory computer-readable medium of claim 14, wherein the data model is a Bayesian Network.

18. The non-transitory computer-readable medium of claim 14, wherein the one or more instructions, that cause the one or more processors to generate the set of forecasts, cause the one or more processors to:
provide the set of performance indicators as input to the data model to cause the data model to update a set of probability tables that are associated with a set of nodes of the data model, and to generate a first forecast, of the set of forecasts, by executing a scoring technique to process the set of probability tables.

19. The non-transitory computer-readable medium of claim 14, wherein the one or more instructions, that cause the one or more processors to perform the one or more actions, cause the one or more processors to:

determine that the set of forecasts do not include the particular forecast with the ETL completion time that that satisfies the threshold completion time, and automatically perform the one or more actions based on determining that the set of forecasts do not include the particular forecast with the ETL completion time that satisfies the threshold completion time,
wherein the one or more actions cause the ETL system to execute the group of ETL jobs within the threshold completion time.

20. The device of claim 1, wherein the set of exceptions include at least one of:
  a first exception to remove a particular performance indicator if the particular performance indicator is associated with a first ETL job that generates a threshold amount of the source data,
  a second exception to remove the particular performance indicator if the particular performance indicator is associated with a second ETL job that is being supported by a new device, a new component, or a new element within the ETL system, or
  a third exception to modify the particular performance indicator to account for seasonal variations associated with the particular performance indicator.

* * * * *